No. 891,602. PATENTED JUNE 23, 1908.
J. E. DE MAREY.
SPUR CENTER.
APPLICATION FILED SEPT. 16, 1907.
2 SHEETS—SHEET 1.
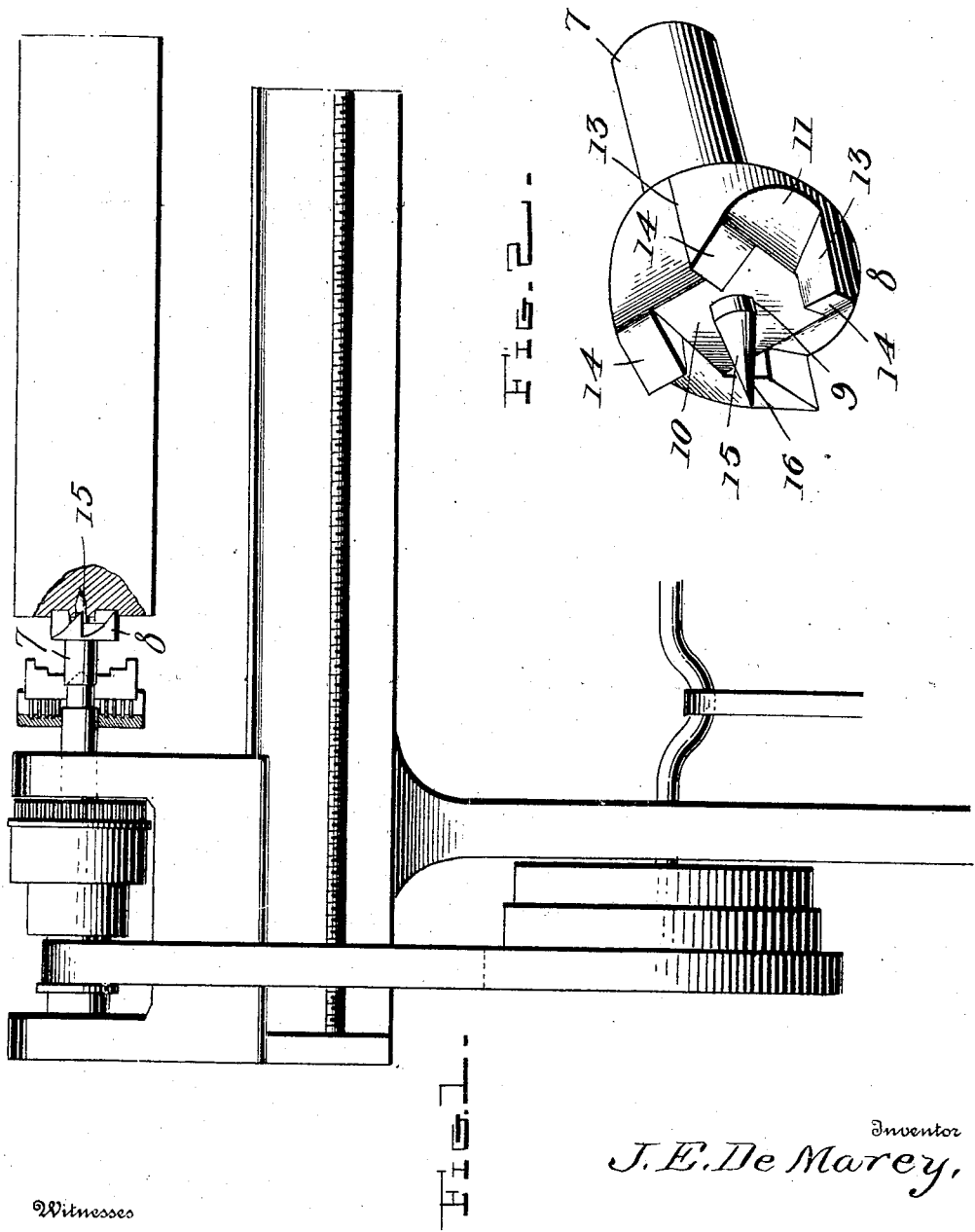
Inventor
J. E. De Marey,
Witnesses
By Woodward & Chandler
Attorney No. 891,602.
PATENTED JUNE 23, 1908.
J. E. DE MAREY.
SPUR CENTER.
APPLICATION FILED SEPT. 16, 1907.
2 SHEETS—SHEET 2.
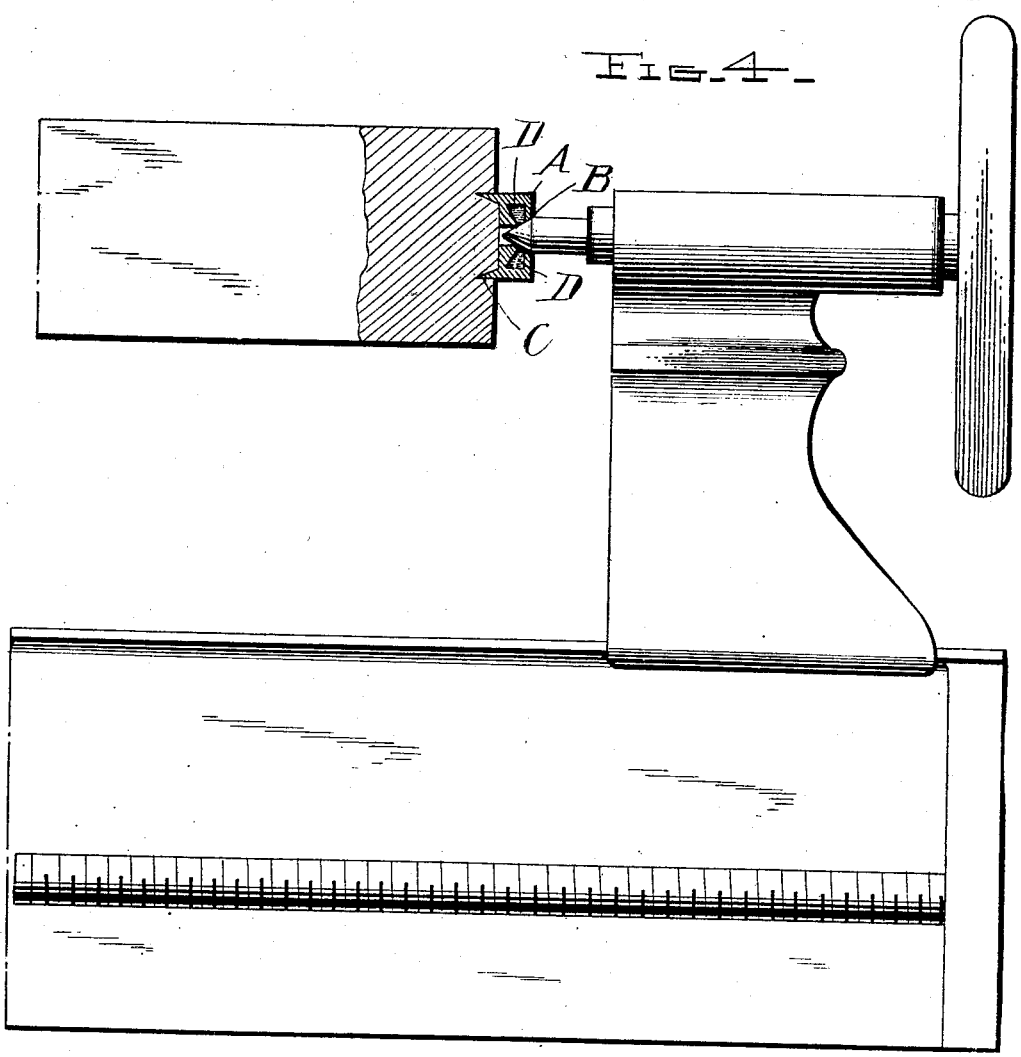
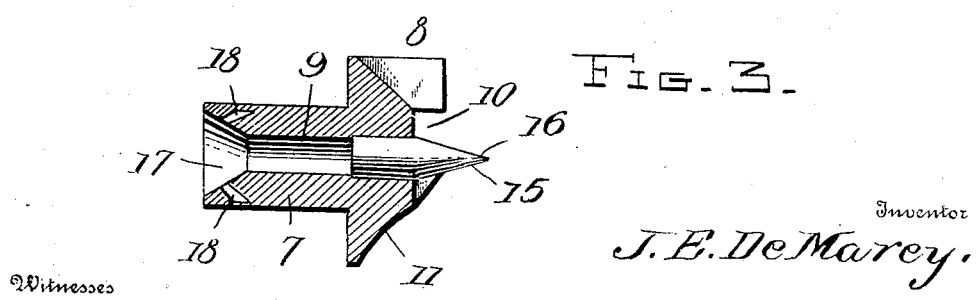
Inventor
J. E. De Marey.

UNITED STATES PATENT OFFICE.

JOSEPH E. DE MAREY, OF BRIDGEPORT, CONNECTICUT.

SPUR-CENTER.

No. 891,602.     Specification of Letters Patent.     Patented June 23, 1908.

Application filed September 16, 1907. Serial No. 393,100.

*To all whom it may concern:*

Be it known that I, JOSEPH E. DE MAREY, a citizen of the United States, residing at Bridgeport, in the county of Fairfield and State of Connecticut, have invented certain new and useful Improvements in Spur-Centers, of which the following is a specification.

This invention relates to lathes and more particularly to centers therefor, and has for its object to provide a spur center arranged for use in a chuck or in connection with a dog to hold a body to be turned in fixed relation to the revoluble member or head of the lathe.

Another object is to provide a spur center which will be extremely simple and which may thus be manufactured at a low figure.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views,—Figure 1 is a view showing a portion of a lathe in section, the present spur center being engaged in the chuck. Fig. 2 is a perspective view of the present center. Fig. 3 is a longitudinal view of the center taken in sections. Fig. 4 is a detailed view showing the arrangement and use of the tail piece.

Referring now to the drawings, the present spur center comprises a stem 7, of cylindrical shape and carrying an enlarged angular head 8 at its forward end. A longitudinal passage 9 is formed through the stem, and is extended through the head 8, this passage communicating centrally with an angular recess 10 formed in the forward space of the head.

The portion of the head 8 surrounding the central recess 10, is cut away as shown at 11, to form a plurality of forwardly directed teeth, each having a straight face 13 and a slanted face 14, the straight faces being turned in a common direction circumferentially of the head.

A center pin 15 is driven into the forward end of the passage 9, and has its forward end sharpened as shown at 16, this center pin extending forwardly beyond the free ends of the teeth 12 for engagement a considerable distance into a body to be turned, while the teeth 12 are embedded but slightly in the end of such a body, as shown in the drawings. By reason of the formation of the recess 10, the center pin lies in spaced relation to the teeth 12, as shown.

It will of course be understood that the straight faces 13 of the teeth 12 are turned in the direction of rotation of the lathe, so that the tendency is to hold these teeth in engagement with the body to be turned. Should they become firmly embedded in such body, it is only necessary to give the latter a turn in a direction with the straight faces 13, when the slant of the faces 14 will cause the teeth to disengage themselves from the body.

The rearward end of the passage 9 is enlarged conically, as shown, the conical enlargement being indicated at 17. The enlargement is thus arranged to receive the forward extremity of a head center, as shown.

Recesses 18 are formed in the wall of the conical enlargement 17, these recesses being arranged to receive and hold a quantity of oil to lubricate the center so that the spur center may turn freely thereon, when it is desired to use the spur center upon the tail center, which may be done as will be readily understood.

In the last figure of the drawings, there is shown a tail piece of disk form, as indicated at A, provided with a central passage B and equipped with a forwardly extending sharpened peripheral flange C. The rearward portion of the passage B is enlarged conically similar to the enlargement of the passage 9 and is provided with oil receiving recesses D.

It will be understood that the tail piece just described has its peripheral flange engaged in the end of the body to be turned and that it rests with the tail center of the lathe in the conical enlargement of the passage B.

What is claimed is:

1. A center for lathes comprising a body portion having a passage formed therethrough, said passage having its rearward end enlarged conically and provided with oil receiving recesses in its inner surface.

2. A spur center comprising a stem, an angular head carried by the stem, a passage formed through the stem and head, a sharpened center pin engaged in the forward end of the passage, and forwardly extending teeth carried by the head and surrounding the pin.

3. A spur center comprising a stem, a head carried by the stem, said head and stem having a passage formed therethrough, said passage having its rearward end enlarged conically, a plurality of forwardly extending teeth carried by the head, and a center pin engaged in the forward end of the passage, said center pin extending forwardly beyond the teeth and having said forwardly extending portion sharpened.

4. A spur center comprising a stem, a head carried by the stem, said head having a rectangular recess formed centrally in the forward face thereof, said stem and head having a passage formed therethrough communicating with the recess, said head having its peripheral portions cut away to form a plurality of forwardly extending teeth surrounding the rectangular recess, and a center pin engaged in the forward end of the passage and extending through the rectangular recess and projecting beyond the teeth.

In testimony whereof I affix my signature, in presence of two witnesses.

JOSEPH E. DE MAREY.

Witnesses:
HENRY GREENSTEIN,
JOSEPH G. SHAPIRO.